(12) United States Patent
Hirota et al.

(10) Patent No.: US 8,360,187 B2
(45) Date of Patent: Jan. 29, 2013

(54) FORKLIFT

(75) Inventors: Isamu Hirota, Sagamihara (JP);
Shinjiro Murata, Sagamihara (JP);
Shunta Takahashi, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/254,418

(22) PCT Filed: Sep. 25, 2009

(86) PCT No.: PCT/JP2009/066647
§ 371 (c)(1),
(2), (4) Date: Sep. 1, 2011

(87) PCT Pub. No.: WO2010/109699
PCT Pub. Date: Sep. 30, 2010

(65) Prior Publication Data
US 2011/0308869 A1  Dec. 22, 2011

(30) Foreign Application Priority Data
Mar. 25, 2009  (JP) ................. 2009-073786

(51) Int. Cl.
*B60K 11/04* (2006.01)
(52) U.S. Cl. .................................................. 180/68.1
(58) Field of Classification Search ............. 180/68.1, 180/68.2, 68.3, 68.4, 68.6
See application file for complete search history.

(56) References Cited

U.S. PATENT DOCUMENTS

| | | | | |
|---|---|---|---|---|
| 4,109,956 A | * | 8/1978 | Roman | 296/77.1 |
| 4,304,314 A | * | 12/1981 | Sakaguchi et al. | 180/68.2 |
| 4,854,278 A | * | 8/1989 | Honecker | 123/198 E |
| 5,526,872 A | * | 6/1996 | Gielda et al. | 165/41 |
| 5,709,175 A | * | 1/1998 | Carroll | 123/41.49 |
| 6,745,860 B2 | * | 6/2004 | Yabe | 180/68.1 |
| 6,755,267 B2 | * | 6/2004 | Yamada et al. | 180/65.8 |
| 7,014,007 B2 | * | 3/2006 | Iwamoto | 180/311 |
| 2008/0142285 A1 | * | 6/2008 | McCurdy et al. | 180/68.1 |

FOREIGN PATENT DOCUMENTS

| | | |
|---|---|---|
| JP | 57-13319 U | 1/1982 |
| JP | 2-88826 U | 7/1990 |
| JP | 04-109623 U | 9/1992 |
| JP | 11-139171 A | 5/1999 |
| JP | 2001-19376 A | 1/2001 |
| JP | 3882296 B2 | 2/2007 |

* cited by examiner

*Primary Examiner* — J. Allen Shriver, II
*Assistant Examiner* — James Triggs
(74) *Attorney, Agent, or Firm* — Birch, Stewart, Kolasch & Birch, LLP

(57) ABSTRACT

A forklift is provided with a front axle (1) for front wheels, a rear axle for rear wheels, an engine (2) for generating driving force of the front axle, a transmission (3) for transmitting power from the engine to the front axle, a radiator (4) mounted behind the engine, a hydraulic pipe insertion plate (5) provided below the radiator and having formed therein a through-hole for a hydraulic pipe, and a shroud-equipped air delivery fan (6) provided in front of the radiator and sending air to the radiator. A flow regulating member (10) is provided on the front surface side of the hydraulic pipe insertion plate, and the flow regulating member is mounted so as not to interfere with the hydraulic pipe and causes air which flows rearward of the vehicle body when the engine is operated to flow toward the shroud-equipped air delivery fan.

18 Claims, 5 Drawing Sheets

FORKLIFT

BACKGROUND OF THE INVENTION

1. Field of the Invention

The present invention relates to a forklift equipped with a fork for transporting a load, in particular to regulate a flow of cooling air toward a radiator.

2. Description of the Related Art

As a forklift equipped with a fork for transporting a load, there is a forklift which is capable of preventing exhaust warm air from flowing back in again, has a high cooling performance of the radiator and is easy to assemble. One example is shown in Patent Document 1.

The forklift described in Patent Document 1 is illustrated in FIG. 5 and comprises an air delivery fan 100, a radiator 101 for cooling engine cooling water, a counter weight 102 mounted behind the radiator 101, and a muffler provided between the radiator 101 and the counter weight 102. The counter weight 102 has a through-hole 102a formed therein. The exhaust air S is blown by the air delivery fan 100 through the radiator 101 so as to be heated, and the exhaust warm air S having been heated is discharged through the through-hole 102a. With this configuration, the forklift is capable of preventing the exhaust warm air from flowing back in and improving the cooling performance of the radiator 101 and is easy to assemble.

However, Patent Document 1 disclosing the above forklift does not consider the air flow on an upstream side of the air delivery fan 100. Thus, in such a case that the flow of the air passing through the radiator 101 is deficient, the radiator 101 may not show its full performance.

RELATED ART DOCUMENT

Patent Document

[PATENT DOCUMENT 1] JP11-131971A

SUMMARY OF THE INVENTION

In view of the issues above, an object of the present invention is to provide a forklift that is capable of increasing the flow of the air flowing in the radiator.

The present invention was made to solve the above issues.

The present invention proposes a forklift comprising: a front axle which functions as a drive shaft for front wheels; a rear axle which functions as a rotation shaft for rear wheels; an engine which generates drive force of the front axle; a transmission which transmits power from the engine to the front axle; a radiator which is mounted behind the engine; a hydraulic pipe insertion plate which is provided below the radiator and has a through-hole formed therein for a hydraulic pipe; and a air delivery fan which is provided in front of the radiator and sends air to the radiator, wherein the flow regulating member is mounted so as not to interfere with the hydraulic pipe and causes air flowing rearward of the vehicle body when the engine is operated to flow toward the air delivery fan.

In the present invention, the flow regulating member leads the air flowing in between the engine and the hydraulic pipe insertion plate arranged behind the engine toward the air delivery fan in a positive manner. As a result, the flow of the air into the radiator can be increased. The increased flow of the air improves the cooling performance of the radiator. Thus, it is possible to sufficiently cool the air to be fed into the engine even under high temperature of summer. For instance, the cooling performance of the radiator is sufficient under low temperature of winter and thus the power to drive the air delivery fan can be reduced, thereby saving energy. Further, the flow of the air into the radiator increases and the performance of the radiator is improved, and thus it is possible to downsize the radiator.

For instance, the flow regulating member may partially cover the through-hole formed in the hydraulic pipe insertion plate for the hydraulic pipe.

In this case, the flow regulating member leads the air to the air delivery fan smoothly. Thus, the air is led to the air delivery fan in a positive manner and the performance of the radiator is improved.

The flow regulating member partially covers the through-hole for the hydraulic pipe and thus, of course, the flow regulating member arranged on a front side of the hydraulic pipe insertion plate can be arranged so as not to interfere with the hydraulic pipe with enough space therebetween. This expands the freedom of design.

Further, the flow regulating member may be formed integrally with a vehicle body cross plate and is processed by bending. That is, the flow regulating member and the vehicle body cross plate can be made of an integrated member.

This exerts reinforcing performance of the vehicle body cross plate. The hydraulic pipe insertion plate of the integrated member exerts reinforcing effect on the vehicle body cross plate so as to improve the strength against bending, torsion, tension, buckling and the like of the vehicle body cross plate. Further, the hydraulic pipe insertion plate and the vehicle body cross plate are formed integrally and thus, the number of parts or assembling processes can be reduced and the integrated member constituted of the hydraulic pipe insertion plate an the vehicle body cross plate can be produced at low cost.

It is also preferable that the hydraulic pipe insertion plate is formed by arranging a pair of C-shaped plates so that openings of the C-shaped plates face with each other to form the through-hole of the hydraulic pipe insertion plate, the through-hole having an approximately rectangular cross-sectional shape.

By forming the through-hole into an approximately rectangular cross-shape, the flow regulating member can be arranged so as to cover one of the pair of C-shaped plates of the hydraulic pipe insertion plate. And a hydraulic pipe can be inserted through the opening of the C-shaped plate which is not covered by the flow regulating member. The flow regulating member can be positioned by using the pair of C-shaped plates as a guide, and thus the flow regulating member can be installed with ease.

And the hydraulic pipe insertion plate may be formed integrally with a vehicle body frame and installed upright with respect to a horizontal surface. By this, the vehicle body frame and the hydraulic pipe insertion plate can be made out of one plate, i.e. the integrated member. The manufacturing thereof only requires one die-cutting step and a sequence of press-folding steps. As a result, this improves the productivity thereof and is advantageous in terms of production cost.

Alternatively, the flow regulating member may be a block-shaped member.

By forming the flow regulating member as a block-shaped member, the mechanical processing can be made freely and thus, it is possible to freely set the shape of the flow regulating surface of the flow regulating member in comparison to a sheet-metal processing. In particular, there is a lot of flexibility in the case wherein the flow regulating surface is a curved surface. By this, the air can be introduced more precisely to the air delivery fan.

Further, the block-shaped member may have a front surface that is inclined so as to function as a flow regulating surface.

The air flowing rearward of the vehicle body directly collides with the front surface of the flow regulating member. Thus, using the front surface as the flow regulating surface, significantly increases flow-regulating effect in comparison to using other surfaces.

Further, it is preferable that the block-shaped member is formed into a column having a polygonal cross-sectional shape and a fixing member is arranged on both ends of the block-shaped member in a width direction so as to fix the block-shaped member after being installed.

The block-shaped member formed into a column can be manufactured comparatively easily and the block-shaped member has a polygonal cross-sectional shape and thus, an apex angle thereof can be set freely as not to interfere with the hydraulic pipe. The position of the block-shaped member may be set freely as well. After being installed, the block-shaped member can be fixed with fixing brackets or the like.

Further, in view of weight saving, the block-shaped flow regulating member may be made of plastic.

Further, the flow regulating member may include a plate-like under cover which is arranged below the engine and under the vehicle body and has a dust cover function.

The under cover has dust-cover function as well as flow regulating and other functions. Moreover, the under cover also has a noise reducing function to reduce the noise of the engine. The under cover may have has such a width as to cover only an installation side of the radiator in a width direction of the vehicle, or as to cover the entire width of the vehicle. In view of weight saving, the under cover may preferably be made of plastic. Further, the undercover may be made of a material having aeration property and has a filter function to keep the dust from entering. Further, the flow regulating member may be, for instance, honeycomb type having a plurality of small flow channels inclined upward toward the rear side of the vehicle body. While the air flowing rearward in the vehicle body does not pass through the honeycomb, the air from outside passes through the honeycomb into the vehicle body. This increases the flow of air flowing into the air delivery fan.

Furthermore, an air channel may be preferably formed by the under cover and an engine cover which covers a top surface side of the engine.

By this, the air flowing rearward becomes smoother and the wind blowing to the air delivery fan becomes stronger.

Moreover, it is also preferable that the flow regulating member on the front surface side of the hydraulic pipe insertion plate and the under cover are integrally formed to form an integrated member. For instance, the integrated member can be made of plastic by injection molding. By making the integrated member from plastic, the weight thereof can be lighter and the number of parts can be reduced.

EFFECTS OF THE PRESENT INVENTION

In the forklift of the present invention, the flow of the air flowing into the radiator can be increase.

DETAILED DESCRIPTION OF THE INVENTION

An embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

First Embodiment

Figure 1:
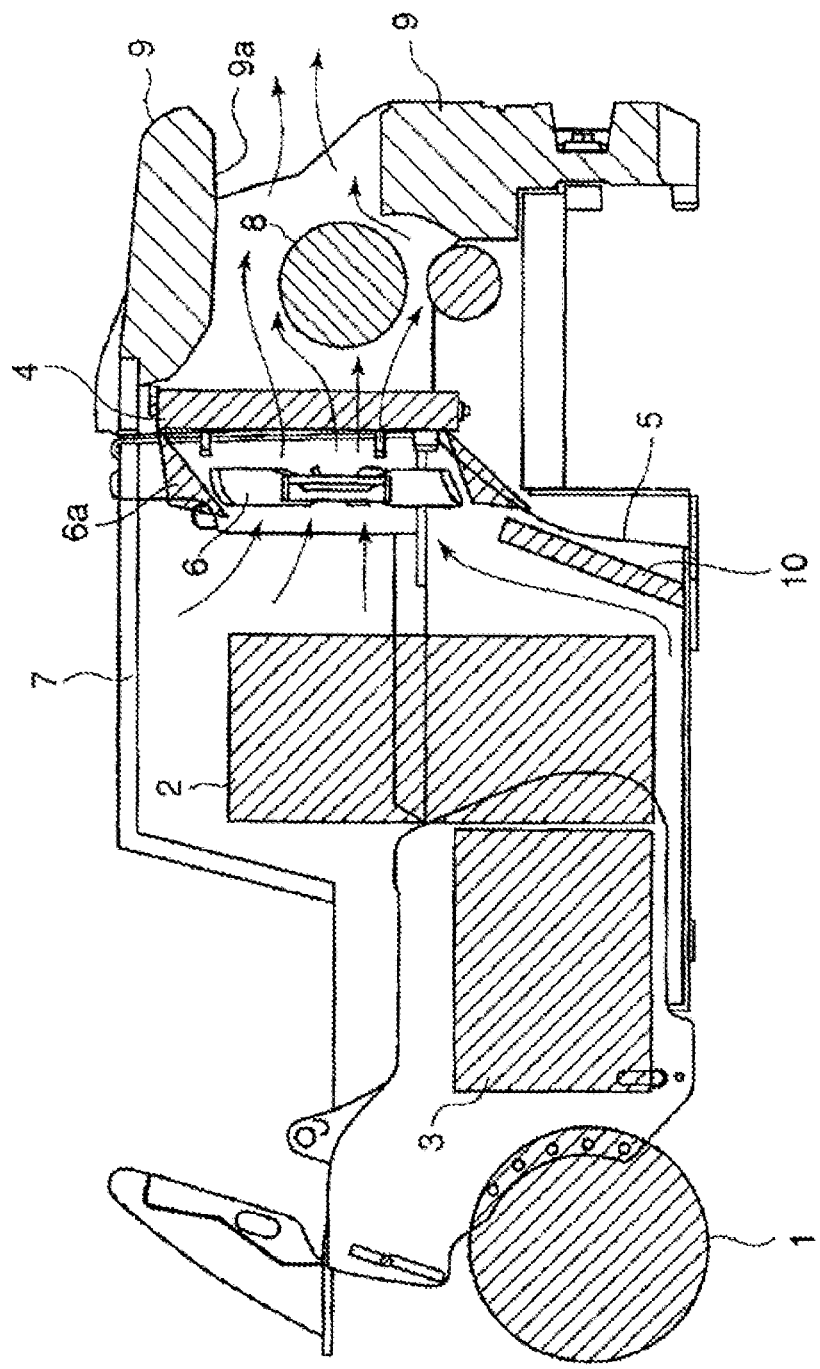
FIG. 1 An explanatory drawing showing a first embodiment of a forklift of the present invention.

FIG. 1 illustrates a first embodiment of the forklift of the present invention. The forklift of the first embodiment comprises a front axle 1 functioning as a drive shaft for front wheels, a rear axle (not shown) functioning as a rotation shaft for rear wheels and an engine 2 for generating drive force of the front axle 1. The forklift further comprises a transmission 3 for transmitting power from the engine 2 to the front axle 1 and a radiator 4 mounted behind the engine 2. The forklift further comprises a hydraulic pipe insertion plate 5 provided below the radiator 4 and having formed therein a through-hole 5a (see FIG. 2) for a hydraulic pipe (not shown), and a shroud-equipped air delivery fan 6 provided in front of the radiator 4 and sending air to the radiator 4.

Above the engine 2 provided is an engine cover 7 disposed over the transmission 3 to the shroud-equipped air delivery fan 6. The radiator 4 is arranged near a rear edge of the engine cover 7. Behind the radiator 4 provided are a muffler 8, a counter weight 9 and so on. That is, the forklift of the embodiment is a forklift of counter-balance type. The counter weight 9 is provided to take measure against the fact that a front part of the forklift becomes heavy when a luggage is loaded on the fork on a front surface side of the forklift. Specifically, the counter weight 9 is provided so as to apply load on the front wheels and the rear wheels of the forklift in a balanced manner. The counter weight 9 has a through-hole 9a through which the air blown from the radiator 4 is discharged outward.

In the forklift of the first embodiment, a flow regulating member 10 is provided on the front surface side of the hydraulic pipe insertion plate 5, and the flow regulating member 10 is mounted so as not to interfere with the hydraulic pipe and causes air flowing rearward of the vehicle body when the engine is operated to flow toward the shroud-equipped air delivery fan 6.

In the embodiment, the flow regulating member 10 leads the air flowing in between the engine and the hydraulic pipe insertion plate 5 arranged behind the engine 2 toward the shroud-equipped air delivery fan 6 in a positive manner, thereby increasing the flow of the air into the radiator 4. The increased flow of the air improves the cooling performance of the radiator. Thus, it is possible to sufficiently cool the air to be fed into the engine even under high temperature of summer. Further, the cooling performance of the radiator 4 is sufficient under low temperature of winter and thus the power to drive the shroud-equipped air delivery fan 6 can be reduced, thereby saving energy. Furthermore, the flow of the air into the radiator 4 increases and the performance of the radiator is improved, and thus it is possible to downsize the radiator 4.

Figure 2:
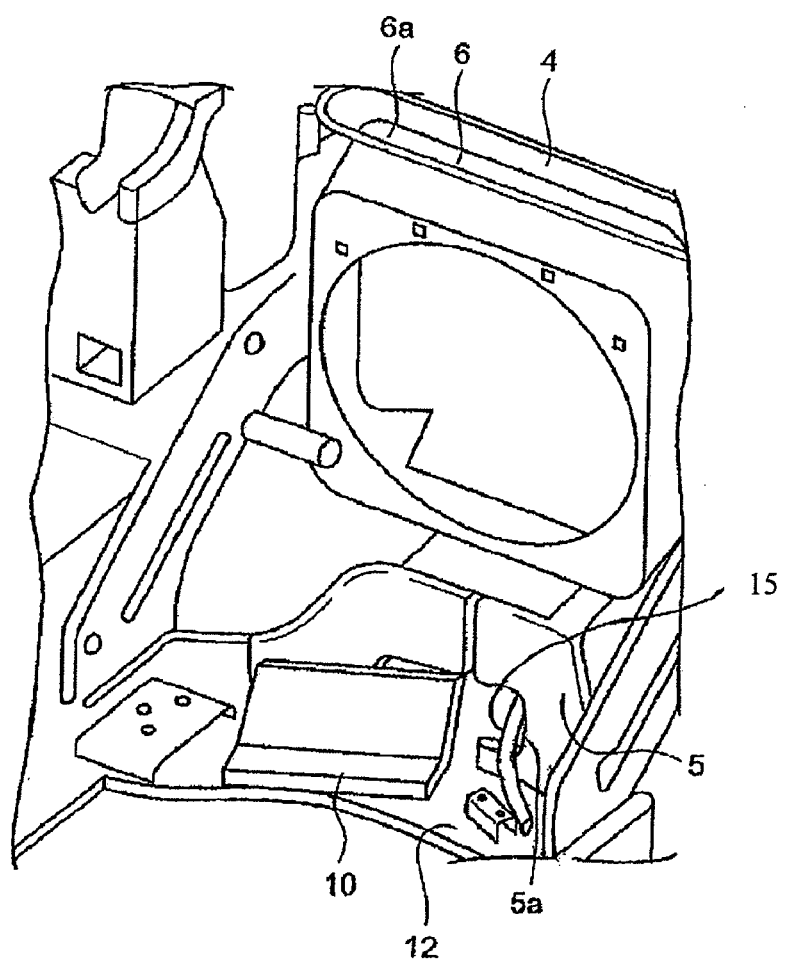
FIG. 2 An explanatory drawing showing a structure around a flow regulating member which is a main component of the present invention.

FIG. 2 is an explanatory drawing showing a structure around the flow regulating member 10 which is a main component of the embodiment. As illustrated in the figure, the shroud-equipped air delivery fan 6 has a shroud 6a of approximately rectangular shape. The air delivery fan is arranged in a frame of the shroud.

Further, right below the shroud-equipped air delivery fan 6, arranged is the flow regulating member 10 which has a surface inclined toward the fan. The flow regulating member 10 leads the air to the air delivery fan 6 smoothly. Thus, the air is led to the air delivery fan 6 in a positive manner and the performance of the radiator 4 is improved.

Furthermore, the flow regulating member 10 is fixed onto a vehicle body cross plate 12 by means of fixing brackets. The flow regulating member 10 has a surface inclined toward the fan. Both ends of the flow regulating member 10 in a lengthwise direction thereof on a bottom surface side are fixed by means of fixing brackets and fastening members. For instance, it is possible to fix a crank plate having a stepped portion having the same thickness as the flow regulating member 10 to the flow regulating member 10 by means of bolts/nuts.

The hydraulic pipe insertion plate 5 of the embodiment is formed integrally with a vehicle body cross plate 12 so as to form an integrated member and the hydraulic pipe insertion plate 5 is processed by bending the integrated member. This exerts reinforcing performance of the vehicle body cross plate. The hydraulic pipe insertion plate 5 of the integrated member exerts reinforcing effect on the vehicle body cross plate so as to improve the strength against bending, torsion, tension, buckling and the like of the vehicle body cross plate 12. Further, the hydraulic pipe insertion plate 5 and the vehicle body cross plate 12 are formed integrally and thus, the number of parts or assembling processes can be reduced and the integrated member constituted of the hydraulic pipe insertion plate 5 an the vehicle body cross plate 12 can be produced at low cost.

More specifically, the hydraulic pipe insertion plate 5 has a pair of C-shaped plates arranged so that openings of the C-shaped plates face with each other to form the through-hole 5a of the hydraulic pipe insertion plate 5. As a result, the through-hole 5a having a rectangular cross-sectional shape can be formed. Further, the flow regulating member 10 is arranged so as to cover one of the pair of C-shaped plates of the hydraulic pipe insertion plate 5. And a hydraulic pipe 15 is inserted through the opening of the C-shaped plate which is not covered by the flow regulating member 10. The flow regulating member 10 can be positioned by using the pair of C-shaped plates as a guide, and thus the flow regulating member 10 can be installed with ease.

As described above, the hydraulic pipe insertion plate 5 is formed integrally with the vehicle body cross plate 12 and installed upright with respect to a horizontal surface. The hydraulic pipe insertion plate 5 may be formed integrally with a vehicle body frame instead of the vehicle body cross plate 12. By making the vehicle body frame and the hydraulic pipe insertion plate 5 out of one plate, i.e. the integrated member, the manufacturing thereof only requires one die-cutting step and a sequence of press-folding steps. As a result, this improves the productivity thereof and is advantageous in terms of production cost.

Figure 3:
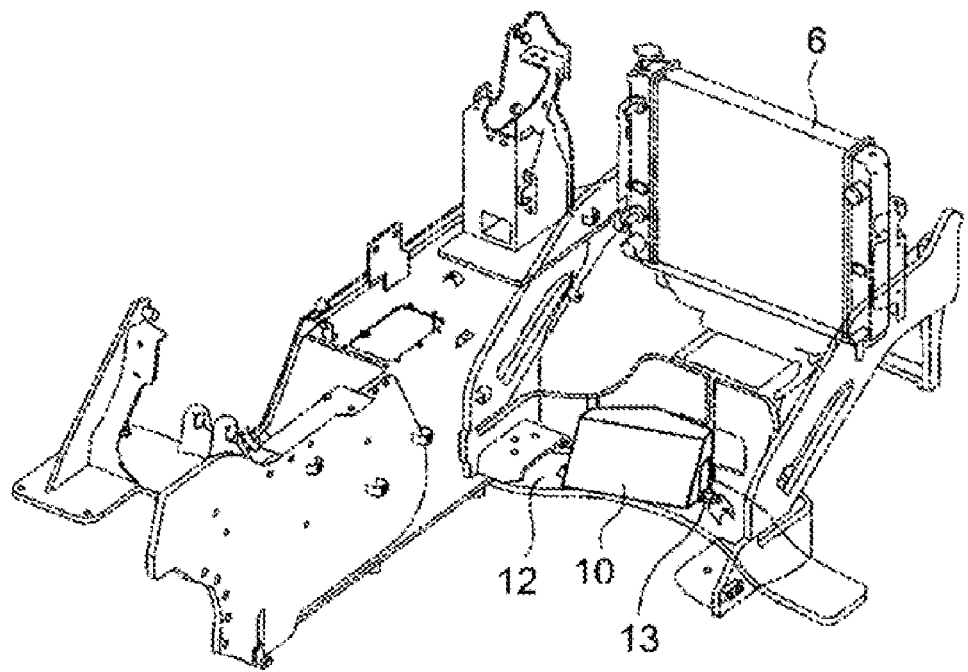
FIG. 3 A perspective view illustrating a detailed structure of FIG. 2.

The first embodiment describes the case wherein the flow regulating member 10 has a surface that is inclined toward the fan. However, the present invention is not limited to this and may include, for instance, the case wherein the flow regulating member 10 is a block-shaped member as illustrated in FIG. 3.

In the case wherein the flow regulating member 10 is a block-shaped member, the mechanical processing can be made freely and thus, it is possible to freely set the shape of the flow regulating surface of the flow regulating member 10 in comparison to a sheet-metal processing. In particular, there is a lot of flexibility in the case wherein the flow regulating surface is a three-dimensional curved surface. By this, the air can be introduced more precisely to the shroud-equipped air delivery fan 6. In this case, a front surface of the flow regulating member 10 is inclined so as to function as a flow regulating surface. The air flowing rearward of the vehicle body directly collides with the front surface of the flow regulating member 10. Thus, using the front surface as the flow regulating surface, significantly increases flow-regulating effect in comparison to using other surfaces.

Further, the flow regulating member 10 is formed into a column having a polygonal cross-sectional shape and fixing brackets 13 are arranged on both ends of the flow regulating member 10 in a width direction thereof so as to fix the flow regulating member 10 after being installed. By this, the block-shaped member formed into a column can be manufactured comparatively easily. The block-shaped member has a polygonal cross-sectional shape and thus, an apex angle thereof can be set freely as not to interfere with the hydraulic pipe. Furthermore, in view of weight saving, the block-shaped flow regulating member 10 may be made of plastic. The structure of FIG. 3 can be preferably applied to a forklift equipped with a gas engine. The flow regulating member 10 may be formed hollow, or into a thin container shape having one surface functioning as an aperture surface. By this, the flow regulating member can be lighter and a cost of material can be reduced. In the case wherein the flow regulating member 10 has a surface functioning as an aperture surface, the flow regulating member 10 is arranged such that the aperture surface is on a rear side so as to avoid the air blowing in.

Second Embodiment

Figure 4:
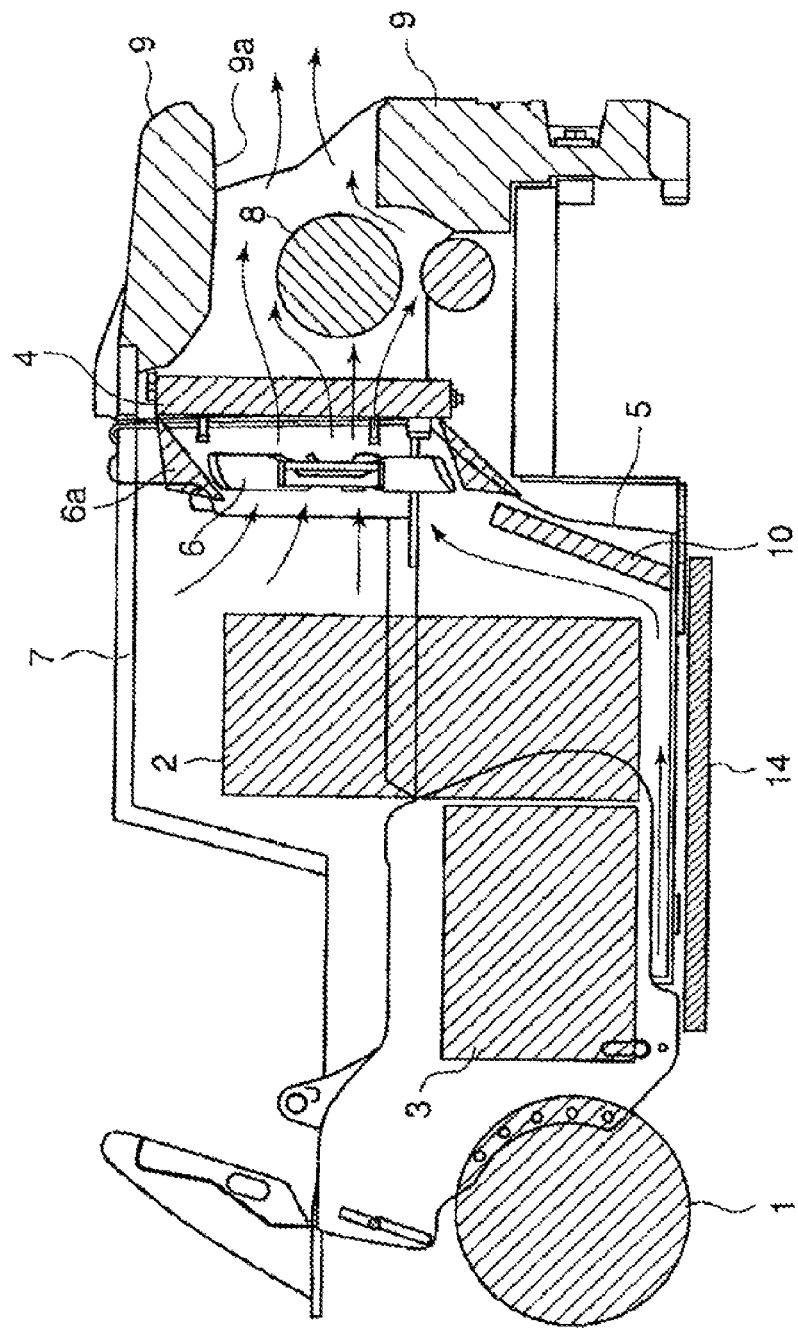
FIG. 4 An explanatory drawing showing a second embodiment of the forklift of the present invention.
Figure 5:
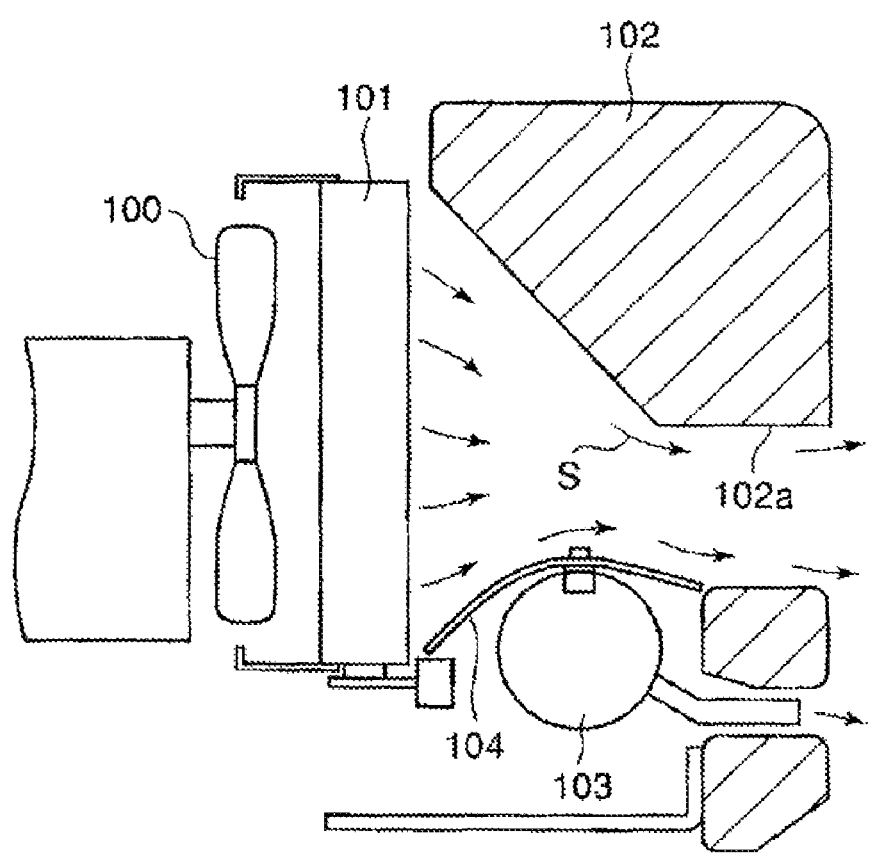
FIG. 5 An explanatory drawing showing a conventional forklift.

FIG. 4 illustrates a second embodiment of the forklift of the present invention. The forklift of the second embodiment is different from that of the first preferred embodiment in that there is a plate-like under cover arranged below the engine.

The under cover 14 as the flow regulating member has dust-cover function as well as flow regulating and other functions. Moreover, the under cover 14 also has a noise reducing function to reduce the noise of the engine. The under cover 14 has such a width as to cover only an installation side of the radiator in a width direction of the vehicle, or as to cover the entire width of the vehicle. However, an air channel is formed by the under cover and an engine cover 7 which covers a top surface side of the engine 2. In such a case that the under cover 7 covers the entire width of the vehicle, the air flowing rearward becomes smoother and the wind blowing to the shroud-equipped fan 6 becomes stronger.

The under cover 14 can be made of metal, or plastic from the perspective of saving weight. Alternatively, the under cover 14 may be made of a material having aeration property and have a filter function to keep the dust from entering. However, the aeration property reduces air channel effect.

Further, the flow regulating member 10 may be, for instance, honeycomb type having a plurality of small flow channels inclined upward toward the rear side of the vehicle body. While the air flowing rearward in the vehicle body does not pass through the honeycomb, the air from outside passes through the honeycomb into the vehicle body. This increases the flow of air flowing into the air delivery fan. By inserting a filter in each channel of the honeycomb, the dust can be kept out.

Furthermore, the second embodiment as described above, illustrates the case wherein the flow regulating member 10 and the under cover 14 as the flow regulating member are separately formed. However, it is possible to form the flow regulating member 10 and the under cover 14 integrally to form an integrated member. For instance, the integrated member can be made of plastic by injection molding. By making the flow regulating member 10 and the under cover 14 from plastic, the weight thereof can be lighter and the number of parts can be reduced. The integrated member may be, for instance, a simple shape such as a flat plate with a curving rear end. The curved rear end has a flow regulating function.

While the present invention has been described with reference to exemplary embodiments, it is to be understood that the invention is not limited to the disclosed exemplary embodiments and that modifications and variations are possible within the scope of the present invention.

INDUSTRIAL APPLICABILITIES

In the forklift of the present invention, the flow regulating member leads the air flowing in between the engine and the hydraulic pipe insertion plate arranged behind the engine toward the shroud-equipped air delivery fan in a positive manner, thereby increasing the flow of the air into the radiator. The present invention can be applied to a general front-wheel drive forklift that is equipped with a radiator, a hydraulic pipe insertion plate and an air delivery fan.

The invention claimed is:
1. A forklift comprising:
a front axle which functions as a drive shaft for front wheels;
a rear axle which functions as a rotation shaft for rear wheels;
an engine which generates drive force of the front axle;
a transmission which transmits power from the engine to the front axle;
a radiator which is mounted behind the engine;
a hydraulic pipe insertion plate which is provided below the radiator and has a through-hole formed therein for a hydraulic pipe; and
an air delivery fan which is provided in front of the radiator and sends air to the radiator,
wherein a flow regulating member is mounted so as not to interfere with the hydraulic pipe and causes air flowing rearward of the vehicle body when the engine is operated to flow toward the air delivery fan,
wherein the hydraulic pipe insertion plate is formed by arranging a pair of C-shaped plates so that openings of the C-shaped plates face with each other to form the through-hole of the hydraulic pipe insertion plate, the through-hole having an approximately rectangular cross-sectional shape, and
wherein the flow regulating member is arranged so as to cover one of the pair of C-shaped plates of the hydraulic pipe insertion plate.
2. The forklift according to claim 1,
wherein the flow regulating member partially covers the through-hole formed in the hydraulic pipe insertion plate for the hydraulic pipe.
3. The forklift according to claim 1,
wherein the flow regulating member is formed integrally with a vehicle body cross plate and is processed by bending.
4. The forklift according to claim 1,
wherein the hydraulic pipe insertion plate is formed integrally with a vehicle body frame and installed upright with respect to a horizontal surface.
5. The forklift according to claim 1,
wherein the flow regulating member is a block-shaped member.
6. The forklift according to claim 5,
wherein the block-shaped member has a front surface that is inclined so as to function as a flow regulating surface.
7. The forklift according to claim 6,
wherein the block-shaped member is formed into a column having a polygonal cross-sectional shape and a fixing member is arranged on both ends of the block-shaped member in a width direction so as to fix the block-shaped member after being installed.
8. The forklift according to claim 6,
wherein the flow regulating member includes a plate-like under cover which is arranged below the engine and under the vehicle body and has a dust cover function.
9. The forklift according to claim 8,
wherein the under cover has such a width as to cover only an installation side of the radiator in a width direction of the vehicle.
10. The forklift according to claim 8,
wherein the undercover has such a width as to cover an entire width of the vehicle.
11. The forklift according to claim 8,
wherein the undercover is made of a material having aeration property and has a filter function to keep the dust from entering.
12. The forklift according to claim 8,
wherein an air channel is formed by the under cover and an engine cover which covers a top surface side of the engine.
13. The forklift,
wherein the flow regulating member is mounted so as not to interfere with the hydraulic pipe and causes air flowing rearward of the vehicle body when the engine is operated to flow toward the air delivery fan and the flow regulating member of claim 8 is integrally formed.
14. The forklift according to claim 11,
wherein an air channel is formed by the under cover and an engine cover which covers a top surface side of the engine.
15. The forklift according to claim 9,
wherein the undercover is made of a material having aeration property and has a filter function to keep the dust from entering.
16. The forklift according to claim 10,
wherein the undercover is made of a material having aeration property and has a filter function to keep the dust from entering.
17. The forklift according to claim 9,
wherein an air channel is formed by the under cover and an engine cover which covers a top surface side of the engine.
18. The forklift according to claim 10,
wherein an air channel is formed by the under cover and an engine cover which covers a top surface side of the engine.

* * * * *